(12) United States Patent
Muthaiyan et al.

(10) Patent No.: US 11,039,404 B2
(45) Date of Patent: Jun. 15, 2021

(54) METHOD FOR CONTROL AND DISTRIBUTION OF THE AMOUNT OF POWER TO BE LOWERED OR RAISED IN A MULTI-LOAD SYSTEM

(71) Applicant: DELL PRODUCTS L.P., Round Rock, TX (US)

(72) Inventors: Arun Muthaiyan, Round Rock, TX (US); Dit Charoen, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 105 days.

(21) Appl. No.: 16/038,295

(22) Filed: Jul. 18, 2018

(65) Prior Publication Data

US 2020/0029284 A1    Jan. 23, 2020

(51) Int. Cl.
*G06F 1/32*        (2019.01)
*H04W 52/34*    (2009.01)
*H04W 52/36*    (2009.01)
*G06F 1/3206*  (2019.01)
*G06F 1/3234*  (2019.01)

(52) U.S. Cl.
CPC ........ *H04W 52/365* (2013.01); *G06F 1/3206* (2013.01); *G06F 1/3234* (2013.01); *H04W 52/343* (2013.01); *H04W 52/346* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 7,400,062 B2* | 7/2008 | Pincu | G06F 1/3203 307/29 |
| 7,444,526 B2* | 10/2008 | Felter | G06F 1/324 713/300 |
| 8,659,263 B2 | 2/2014 | Oglesbee et al. | |
| 8,693,228 B2 | 4/2014 | Matan et al. | |
| 8,898,026 B2 | 11/2014 | Howell et al. | |
| 9,280,796 B2 | 3/2016 | Synesiou et al. | |
| 9,431,828 B2 | 8/2016 | Besser et al. | |
| 9,690,313 B2 | 6/2017 | Matan et al. | |
| 9,808,375 B2 | 11/2017 | Cornelius et al. | |
| 9,960,601 B2 | 5/2018 | Matan et al. | |
| 10,003,196 B2 | 6/2018 | Matan et al. | |
| 10,063,055 B2 | 8/2018 | Matan et al. | |
| 10,097,078 B2 | 10/2018 | Rayner et al. | |
| 10,158,232 B2 | 12/2018 | Matan et al. | |
| 10,158,233 B2 | 12/2018 | Besser et al. | |
| 10,185,346 B2 | 1/2019 | Matan et al. | |
| 10,285,233 B2 | 5/2019 | Muyshondt | |
| 2008/0222435 A1* | 9/2008 | Bolan | G06F 1/3203 713/310 |

(Continued)

*Primary Examiner* — Tanh Q Nguyen
(74) *Attorney, Agent, or Firm* — Jackson Walker LLP; Christopher J. Rourk

(57) ABSTRACT

A system for controlling power, comprising a plurality of processors and a control system configured to interface with each of the plurality of processors, and to 1) determine a power consumption level for each processor, 2) determine a system power floor, 3) determine an overall processor power to be reduced and 4) generate one or more processor controls to adjust one or more processor power levels.

20 Claims, 3 Drawing Sheets

(56) References Cited

U.S. PATENT DOCUMENTS

| | | | |
|---|---|---|---|
| 2009/0125737 A1* | 5/2009 | Brey | G06F 1/3203 |
| | | | 713/322 |
| 2011/0144818 A1* | 6/2011 | Li | G06F 1/3203 |
| | | | 700/291 |
| 2011/0289327 A1* | 11/2011 | Nolterieke | G06F 1/26 |
| | | | 713/300 |
| 2014/0115357 A1* | 4/2014 | Li | G06F 1/3234 |
| | | | 713/320 |
| 2016/0011914 A1* | 1/2016 | Bohn | G06F 9/5094 |
| | | | 713/300 |
| 2020/0029284 A1* | 1/2020 | Muthaiyan | G06F 1/3206 |

* cited by examiner

METHOD FOR CONTROL AND DISTRIBUTION OF THE AMOUNT OF POWER TO BE LOWERED OR RAISED IN A MULTI-LOAD SYSTEM

TECHNICAL FIELD

The present disclosure relates generally to control of power levels within a complex system, and more specifically to a system and method for control and distribution of the amount of power to be lowered or raised in a multi-load system.

BACKGROUND OF THE INVENTION

Competing power requirements for different processors or other components of a complex system can result in some components not getting enough power, as well as overload conditions.

SUMMARY OF THE INVENTION

A system for controlling power is disclosed. The system includes a plurality of processors and a control system configured to interface with each of the plurality of processors, and to 1) determine a power consumption level for each processor, 2) determine a system power floor, 3) determine an overall processor power to be reduced and 4) generate one or more processor controls to adjust one or more processor power levels.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
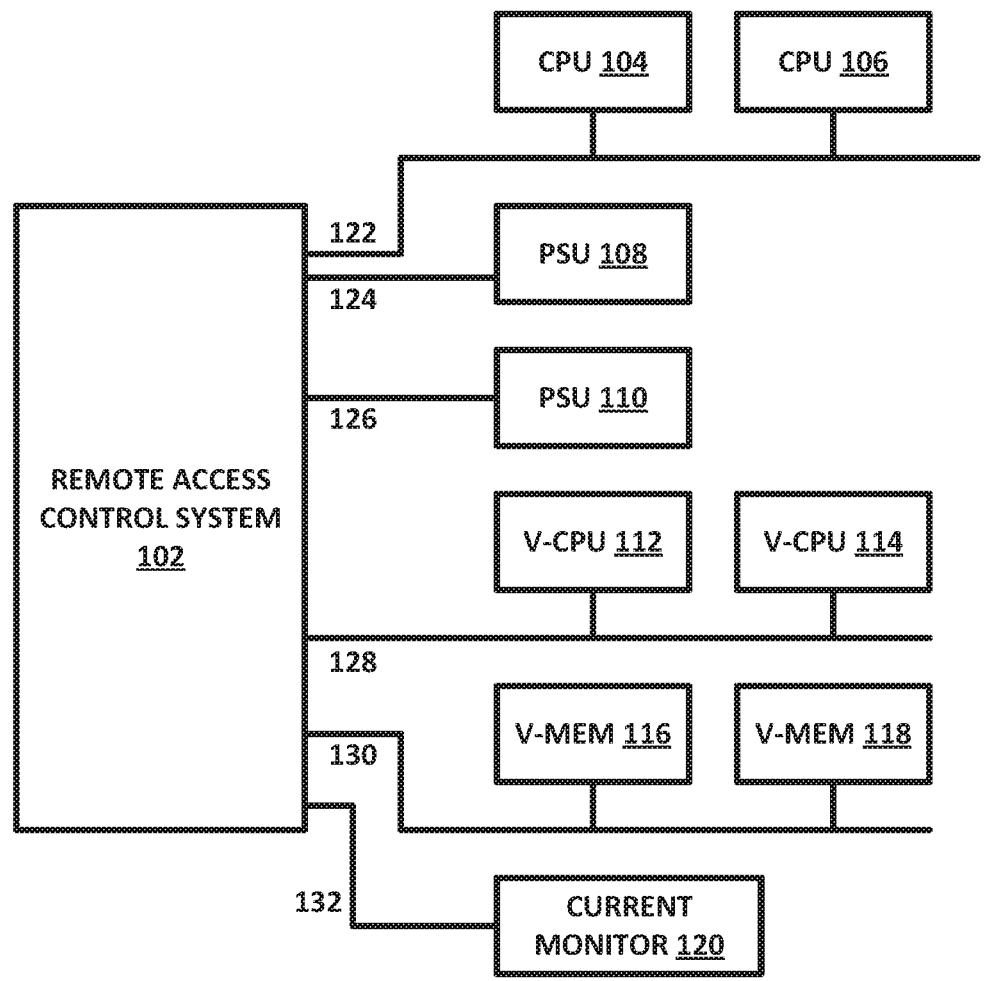
FIG. 1 is a diagram of a system for controlling multiple power levels, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

A server or other complex system can use power limiting functions to keep system power and thermal load within predetermined limits. Power limiting is typically applied at least at the processors, because they typically include functionality that allows them to limit their power within a supported range, and also because they typically make up a major portion of the system load. While processors are generally discussed herein, the present disclosure is applicable to systems that include other power consuming elements, subsystems or components besides processors.

The power control loop can continuously evaluate and determine whether the overall processor power needs to be lowered or can be raised. In a system supporting multiple processors, the amount of power to be lowered or raised can be distributed and applied to the installed processors intelligently and efficiently for prompt and rapid response. Because real-time power consumption is typically not equal among processors, a system that is configured to perform this function should determine processor power limits on a per-processor basis. In one example embodiment, when power needs to be reduced, limiting a processor to a power level higher than its current power consumption results in no power reduction. Similarly, when power should be raised, raising a processor's power limit higher than its maximum power level may result in some increase in processor power from its current level (workload dependent) but no increase beyond its maximum level. Furthermore, the less compute cycles this requires, the faster the control loop can run, providing better control.

The present disclosure provides an efficient and scalable system and method to distribute the amount of power to be lowered or raised across multiple processors or any other energy consuming component, and may also be referred to as the Headroom Distribution Model or HDM. HDM provides the technical advantages of not require sorting or knowing the order of each processor's current power consumption, or any knowledge of the load level on each processor. Instead, power consumption control can be achieved without these additional information and processing intensive steps, which provides the technical advantages of reducing the amount of data that needs to be obtained, tracked and processed to manage power consumption, and thus allows power consumption to be accomplished in a more efficient manner that requires less network and processing resources than known systems and methods of providing power consumption control.

The processor minimum power level can be referred to as the processor power floor or simply processor floor. The processor floor need not be identical across all processors. For example, the primary processor may have operating system overhead and could conceivably be given a higher floor.

The present disclosure thus provides for scalable power limit distribution in a multiple-load system. A request to apply a power limit to a processor can be minimized by tracking previously sent values and sending a new request only if the new limit is different. The HDM can be implemented in some example embodiments as an algorithm that can be applied to a suitable multi-load system, such as a system that includes an overall distributed limit. Such distributed limits need not be power limits. The loads also do not need to be processors and instead can be any suitable subsystem or entity that consumes some limited resource with the ability for the consumption of that resource to be limited within a supported range. For example, the loads could be entire server nodes such as blades/sleds in a modular or a multi-node system.

The present disclosure thus provides the technical advantage of an efficient method to distribute the lowering or raising of power limit to multiple loads. The present disclosure does not require sorting or knowing the order of each load's power level, and does not require any knowledge of the workload level at each load.

When the overall processor power needs to be reduced (ProcOverLimit>0), the procedure in one example embodiment can be as follows. First, the overall current processor power consumption can be determined, such as by using the algorithm:

ProcPower=sum(ProcXPower)

where
ProcPower is the sum of all installed processors' power, and
ProcXPower is the current power level at each installed processor.

The overall processor power floor can then be determined, such as by using the algorithm:

ProcFloor=sum(ProcessorXFloor)

where
ProcFloor is the sum of all installed processors' power floor, and
ProcXFloor is the power floor setting at each installed processor.

The overall processor power available to be reduced can then be determined, such as by using the algorithm:

ProcPowerAvailToReduce=ProcPower−ProcFloor

If the overall processor power available to be reduced is less than or equal to the amount needed to be reduced, the processor floor can be applied to each processor, such as by skipping the next step and using the algorithm:

ProcXLimit=ProcXFloor

If the overall processor power available to be reduced is not less than or equal to the amount needed to be reduced (i.e., if the overall processor power available to be reduced is greater than the amount needed to be reduced), then the following step can be used. First, the power limit of each processor can be initialized to the average per-processor power limit, which can be the overall current processor power consumption less the amount needed to be reduced, and then divided by number of installed processors, such as by using the algorithm:

ProcXLimit=(ProcPower−ProcOverLimit)/nProc where nProc is number of installed processors.

For each processor with a current power consumption equal to or below the average power limit, its power limit can be reduced and set at a current power consumption. The resulting headroom (which is initialized to 0) from its current power level to the average power limit is taken away and accumulated, to be distributed in the next step:

```
if(ProcXLimit >= ProcXPower ){
    Headroom = Headroom + (ProcXLimit − ProcXPower)
    ProcXLimit = ProcXPower
}
```

For each processor with current power consumption above the average power limit, its power limit is adjusted up by any accumulated headroom in the previous step, up to its current power consumption or until the headroom is depleted, whichever occurs first. Any remaining processors get no adjustment to their limit:

```
if( ProcXLimit < ProcXPower ) {
    if( ProcXPower < (ProcXLimit + Headroom) ) {
        Headroom = Headroom − ( ProcXPower − ProcXLimit )
        ProcXLimit = ProcXPower
    } else {
        ProcXLimit = ProcXLimit + Headroom
        Headroom = 0
    }
}
```

An additional optimization step to minimize communication is to keep track of ProcXLimit and send a new ProcXLimit to Processor X only if it is different from the previous value.

The processors can prioritized and such prioritization can be user-defined in deciding which processor gets its power limit adjusted up first, second, and so on.

FIG. 1 is a diagram of a system 100 for controlling multiple power levels, in accordance with an example embodiment of the present disclosure. System 100 includes remote access control system 102, central processing units (CPUs) 104 and 106, power supply units (PSUs) 108 and 110, CPU voltage regulators (V-CPUs) 112 and 114, memory voltage regulators (V-MEMs) 116 and 118, current monitor 120, and communications ports 122 through 132, each of which can be implemented in hardware or a suitable combination of hardware and software.

Remote access control system 102 is used to control the power level of the associated components and subsystems of system 100, and can be a baseboard management controller (BMC), an iDRAC or other suitable controllers. In one example embodiment, the disclosed algorithms for controlling the power level of multiple components can be implemented using object oriented programming or other suitable programming paradigms that allow power control algorithms operating on other systems and components of system 100 to be controlled in a coordinated manner.

CPUs 104 and 106 can be general purpose CPUs, and include one or more power control algorithms that can include user-selectable configuration settings, such as maximum and minimum power settings, thermal settings, frequency settings or other suitable settings. Each CPU can thus implement its own power control scheme, independent of the overall system power control.

PSUs 108 and 110 can be general purpose OSUs, and include one or more power control algorithms that can include user-selectable configuration settings, such as maximum and minimum power settings, thermal settings, voltage settings, current settings or other suitable settings. Each PSU can thus implement its own power control scheme, independent of the overall system power control.

CPU voltage regulator (V-CPU) 112 and 114 are used to control the voltage provided to a corresponding CPU, such as one of CPUs 104 and 106. V-CPU 112 and 114 can be used to implement a power control algorithm, can implement separate and stand-alone power control algorithms and can perform other suitable functions.

Memory voltage regulator (V-MEM) 116 and 118 are used to control the voltage provided to a corresponding memory unit. V-MEM 116 and 118 can be used to implement a power control algorithm, can implement separate and stand-alone power control algorithms and can perform other suitable functions.

Current monitor 120 monitors electrical current provided to one or more system components, such as CPUs 104 and 106, PSU 108 and 110, V-CPU 112 and 114, V-MEM 116 and 118 or other suitable components. Current monitor 120 can be used to implement a power control algorithm, can implement separate and stand-alone power control algorithms and can perform other suitable functions.

Communications ports 122 through 132 are used to provide communications between remote access control system 102 and other components of system 100. In one example embodiment, communications ports 122 through 132 can use the server message block (SMB) communications protocol or other suitable communications protocols.

In operation, remote access control system 102 is configured to control multiple power levels of the separate systems and components of system 100. For example, remote access control system 102 can receive power level data and can adjust power levels at each component without receiving additional power level data. System 100 thus provides the technical advantage of reducing power consumption in a complex system without requiring continuous power monitoring of system component power levels.

Figure 2:
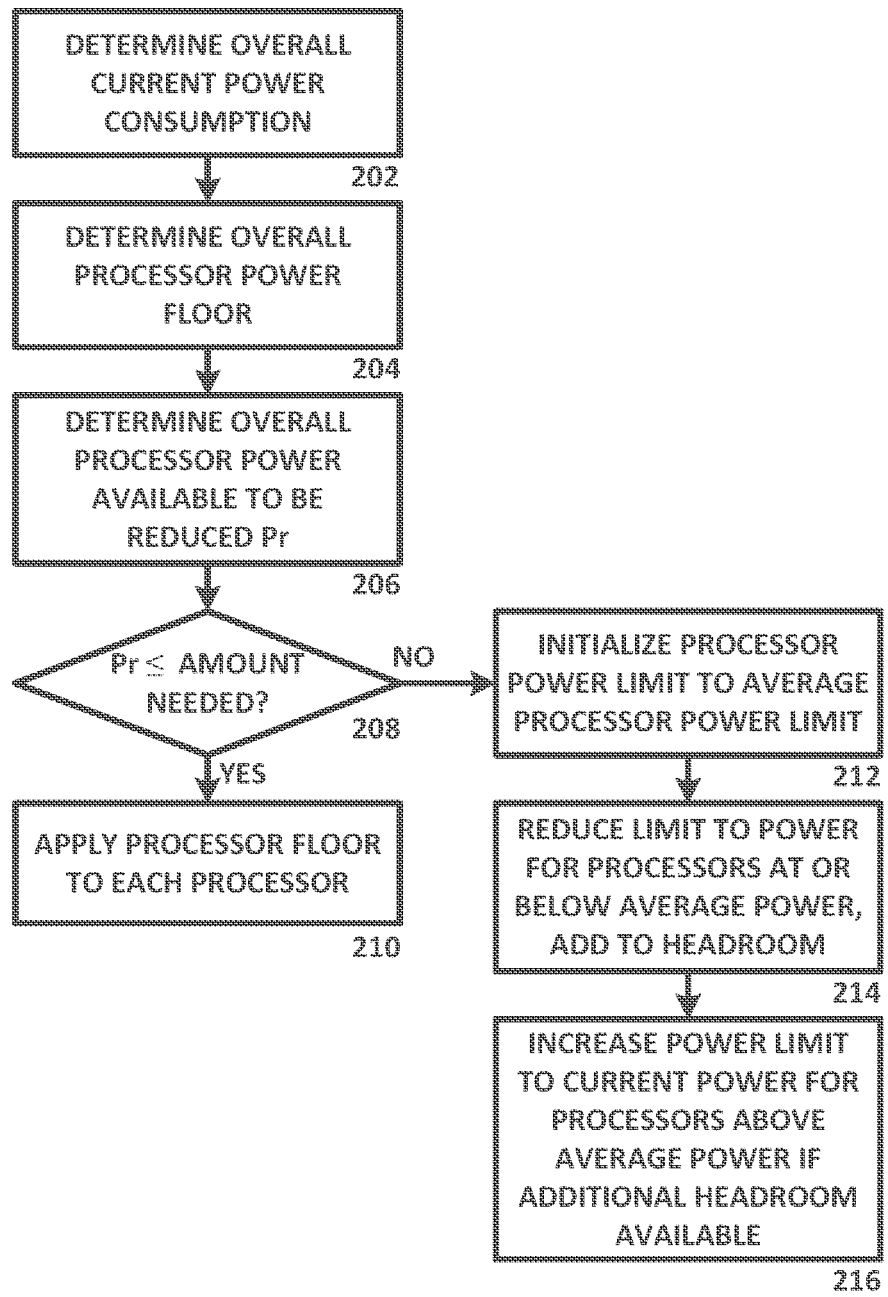
FIG. 2 is a diagram of an algorithm for controlling multiple power levels, in accordance with an example embodiment of the present disclosure.
Figure 2:

FIG. 2 is a diagram of an algorithm 200 for controlling multiple power levels, in accordance with an example embodiment of the present disclosure.

Algorithm 200 begins at 202, where an overall current power consumption is determined. In one example embodiment, the overall current power consumption can be determined by adding a plurality of variables, data register entries or other preexisting information, by querying a plurality of processors, power supply units, voltage regulators, current monitors, or other devices or systems for a current power consumption or in other suitable manners. The algorithm then proceeds to 204.

At 204, the overall processor power floor is determined. In one example embodiment, the overall processor power floor can be determined by receiving a power control setting or in other suitable manners. The algorithm then proceeds to 206.

At 206, the overall processor power available to be reduced is determined. In one example embodiment, the overall processor power available to be reduced can be determined by subtracting the overall processor power floor from the overall current power consumption, or in other suitable manners. The algorithm then proceeds to 208.

At 208, it is determined whether the overall processor power available to be reduced is less than or equal to the amount of power needed to be reduced. If the overall processor power available to be reduced is less than or equal to the amount of power needed to be reduced, the algorithm then proceeds to 210 where the processor floor is applied to each processor. Otherwise, the algorithm proceeds to 212.

At 212, each processor power limit is initialized to the average processor power limit. In one example embodiment, the processor power limit can be set for each processor of a plurality of processors, such as by storing a processor power limit in a predetermined register, by transmitting a setting control message to each processor from a controller or in other suitable manners. While a query can be sent to a processor if needed, the objective is to reduce such queries and thus to use stored power level data if possible. In this regard, a query might be sent every other time, every third time, or so forth, so as to reduce the number of queries required. The algorithm then proceeds to 214.

At 214, the power limits are reduced for processors at or below the average power limit. The amount thus reduced is accumulated as headroom to be distribute at 216. In one example embodiment, the processor power limit can be reduced for each processor of a plurality of processors, such as by storing a processor power limit in a predetermined register, by transmitting a setting control message to each processor from a controller or in other suitable manners. While a setting control can be sent to a processor if needed, the objective is to reduce such setting controls and thus to use stored power level data if possible. In this regard, a setting control might be sent every other time, every third time, or so forth, so as to reduce the number of setting controls required. The algorithm then proceeds to 216.

At 216, the power limits are increased for processors with power level above the average power limit up to and until the accumulated headroom in 214 is exhausted. In one example embodiment, the processor power limit can be set for each processor of a plurality of processors, such as by storing a processor power limit in a predetermined register, by transmitting a setting control message to each processor from a controller or in other suitable manners. While a setting control can be sent to a processor if needed, the objective is to increase such setting controls and thus to use stored power level data if possible. In this regard, a setting control might be sent every other time, every third time, or so forth, so as to reduce the number of setting controls required.

Although algorithm 200 is shown as a flow chart, it can also or alternatively be implemented using multiple flowcharts, object oriented programming, state diagrams or other suitable programming paradigms, and can be implemented on a single processor or multiple parallel or distributed processors.

Figure 3:
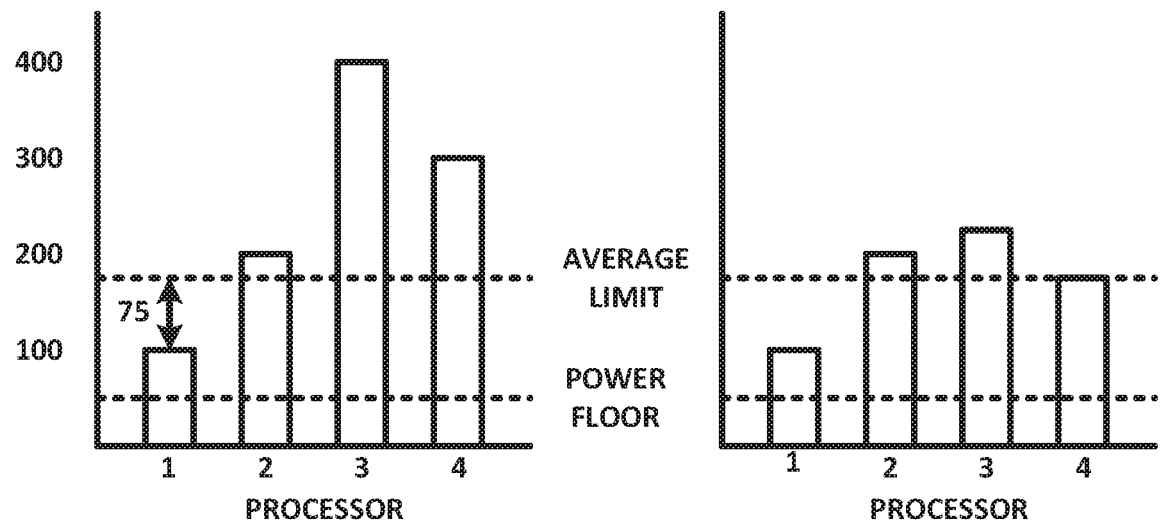
FIG. 3 is a diagram of power level settings at a plurality of processors, in accordance with an example embodiment of the present disclosure.

FIG. 3 is a diagram 300 of power level settings at a plurality of processors, in accordance with an example embodiment of the present disclosure. Diagram 300 shows an application of the above algorithm, extended to minimize communication with the processor by keeping track of previous ProcXLimit and dispatching a new ProcXLimit request to the corresponding processor only if the new request is different from the previous ProcXLimit request.

In this example, let:

$ProcOverLimit = 300$ Watts $ProcXFloor = 50$ Watts $SetLimitToFloor = False$

Sum $(ProcXPower) = 100 + 200 + 400 + 300 = 1000$ Watts

Sum $(ProcXFloor) = 50 + 50 + 50 + 50 = 200$ Watts $ProcPowerAvailToReduce = 1000 - 200 = 800$ Watts Average $ProcXLimit = (1000 - 300)/4 = 175$ Watts $Proc1Limit = 100$; Headroom $= 175 - 100 = 75$ Watts $Proc2Limit = 175 + 25 = 200$; Headroom $= 75 - 25 = 50$ Watts $Proc3Limit = 175 + 50 = 225$; Headroom $= 0$ Watts $Proc4Limit = 175$ Sum $(ProcXLimit) = 100 + 200 + 225 + 175 = 700$ Watts $= $ Sum $(ProcXpower) - ProcOverLimit$ When the overall processor power should be raised (ProcOverLimit=0 and ProcRaiseLimit>0), the following procedure can be used. First, the overall current processor power consumption is determined, such as by using the following algorithm:

ProcPower=sum(ProcXPower)

where ProcXPower is the current power level at each installed processor. If the overall processor power to be raised (ProcRaiseLimit) added to the overall current processor power exceeds the maximum processor power for all processors combined, then the processor power limits are removed, such as by using the following algorithm, and the next step is skipped:

if((ProcRaiseLimit+ProcPower)>
(nProc*PerProcMaxPower))

ProcXLimit=PerProcMaxPower

ProcRaiseLimit is then distributed equally among the processors up to maximize the processor power, such as by using the following process. First the headroom is initialized to the ProcRaiseLimit, such as by using the following algorithm:

Headroom=ProcRaiseLimit

For each installed processor except the last one, raise the power limit by (ProcRaiseLimit/nProc), but only up to maximum processor power, and subtract the amount raised from headroom, such as by using the following algorithm:

ProcXLimit=min(PerProcMaxPower,ProcXPower+
(ProcRaiseLimit/nProc))

Headroom=Headroom−(ProcXLimit−ProcXPower)

For the last processor, give it the remaining headroom up to max processor power.

ProcXLimit=min(PerProcMaxPower,ProcXPower+
Headroom)

Figure 4:
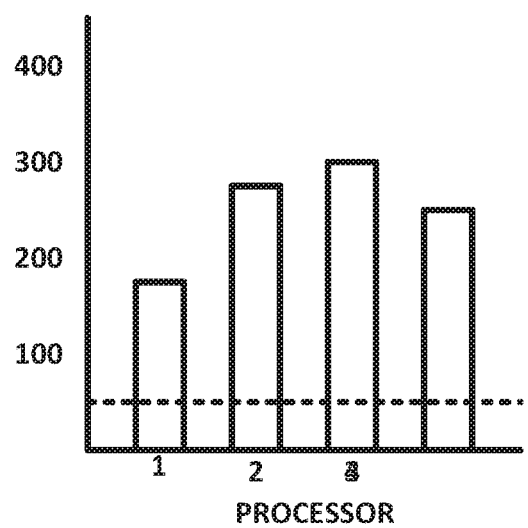
FIG. 4 is a diagram of power level settings at a plurality of processors, in accordance with an example embodiment of the present disclosure.

FIG. 4 is a diagram 400 of power level settings at a plurality of processors, in accordance with an example embodiment of the present disclosure. In this example embodiment, power to the processors is raised from the previous state instead of being lowered, where the previous workload on each processor is steady and has not changed, and where the objective is to raise total processor power back to 1000 W.

In this example embodiment, the following algorithm can be used to adjust the power levels of the four processors.

```
PerProcMaxPower = 500 Watts
Decision Interval 1:
    Inputs:
        Proc1Power = 100 Watts
        Proc2Power = 200 Watts
        Proc3Power = 225 Watts
        Proc4Power = 175 Watts
        ProcRaiseLimit = 1000−(100+200+225+175)= 300 Watts
    Outputs:
        Proc1Limit = min( 500, 100 + ( 300 / 4 )) = 175 Watts
        Headroom = 300 − (175 − 100) = 225 Watts
        Proc2Limit = min( 500, 200 + ( 300 / 4 )) = 275 Watts
        Headroom = 225 − (275 − 200) = 150 Watts
        Proc3Limit = min( 500, 225 + ( 300 / 4 )) = 300 Watts
        Headroom = 150 − (300 − 225) = 75 Watts
    // Only Proc4 is remaining
        Proc4Limit = 175 + 75 = 250 Watts
        Headroom = 0 Watts
Decision Interval 2:
    Inputs:
        Proc1Power = 100 Watts
        Proc2Power = 200 Watts
        Proc3Power = 300 Watts
        Proc4Power = 250 Watts
        ProcRaiseLimit = 1000 − (100 + 200 + 300 + 250) = 150 Watts
    Outputs:
        Proc1Limit = min( 500, 100 + ( 150 / 4 )) = 137.5 Watts
        Headroom = 150 − (137.5 − 100) = 112.5 Watts
        Proc2Limit = min( 500, 200 + ( 150 / 4 )) = 237.5 Watts
        Headroom = 112.5 − (237.5 − 200) = 75 Watts
        Proc3Limit = min( 500, 300 + ( 150 / 4 )) = 337.5 Watts
        Headroom = 75 − (337.5 − 300) = 37.5 Watts
    // Only Proc4 is remaining
        Proc4Limit = 250 + 37.5 = 287.5 Watts
        Headroom = 0 Watts
Decision Interval 3:
    Inputs:
        Proc1Power = 100 Watts
        Proc2Power = 200 Watts
        Proc3Power = 337.5 Watts
        Proc4Power = 287.5 Watts
        ProcRaiseLimit = 1000 − (100+200+337.5+287.5) = 75 Watts
    Outputs:
        Proc1Limit = min( 500, 100 + ( 75 / 4 )) = 118.75 Watts
        Headroom = 75 − (118.75 − 100) = 56.25 Watts
        Proc2Limit = min( 500, 200 + ( 75 / 4 )) = 218.75 Watts
        Headroom = 56.25 − (218.75 − 200) = 37.5 Watts
        Proc3Limit = min( 500, 337.5 + ( 75 / 4 )) = 356.25 Watts
        Headroom = 37.5 − (356.25 − 337.5) = 18.75 Watts
    // Only Proc4 is remaining
        Proc4Limit = 287.5 + 18.75 = 306.25 Watts
        Headroom = 0 Watts
```

Figure 5:
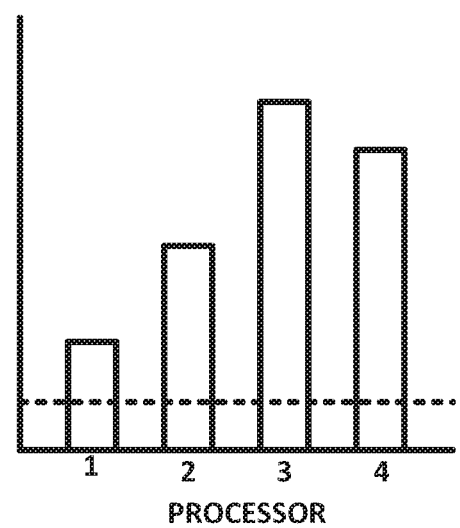
FIG. 5 is a diagram of power level settings at a plurality of processors, in accordance with an example embodiment of the present disclosure.

FIG. 5 is a diagram 500 of power level settings at a plurality of processors, in accordance with an example embodiment of the present disclosure. In this example embodiment, power to the processors adjusted.

```
Decision Interval 4:
    Inputs:
        ProcRaiseLimit = 43.75 Watts
        Proc1Power = 100 Watts
        Proc2Power = 200 Watts
        Proc3Power = 356.25 Watts
        Proc4Power = 300 Watts
        ProcRaiseLimit = 1000−(100+200+356.25+300)= 43.75 Watts
    Outputs:
        Proc1Limit = min( 500, 100 + ( 43.75 / 4 )) = 110.94 Watts
        Headroom = 43.75 − (110.94 − 100) = 32.81 Watts
        Proc2Limit = min( 500, 200 + ( 43.75 / 4 )) = 210.94 Watts
        Headroom = 32.81 − (210.94 − 200) = 21.87 Watts
        Proc3Limit = min (500,356.25+(43.75/4)) = 367.19 Watts
        Headroom = 21.87 − (367.19 − 356.25) = 10.93 Watts
    // Only Proc4 is remaining
        Proc4Limit = 300 + 10.93 = 310.93 Watts
        Headroom = 0 Watts
```

After four decision intervals, the load profile essentially resembles the starting profile in Example 1 with the load on Proc3 already at 92% (367.19/400) and gradually approaching the initial load (400 W).

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling power, comprising:
a plurality of processors;
a control system operating on a processor and configured to interface with each of the plurality of processors, to determine a power consumption level for each processor of the plurality of processors, to determine an overall processor power floor, to determine an overall processor power available to be reduced, to initialize each processor power limit to an average processor power limit when the overall processor power available to be reduced is greater than an amount of power that is needed to be reduced, and to generate one or more processor controls to adjust one or more of the processor power limits from the average processor power limit,
the average processor power limit being the ratio of the difference between an overall processor power consumption and the amount of power that is needed to be reduced over the number of processors in the plurality of processors,
the overall processor power available to be reduced being the difference between the overall processor power consumption and the overall processor power floor.

2. The system of claim 1 wherein the control system is further configured to transmit a power adjustment control to each processor of the plurality of processors that are at or below the average processor power limit to reduce the processor power limits for the processors of the plurality of processors that are at or below the average processor power limit from the average processor power limit.

3. The system of claim 1 wherein the control system is further configured to query each of the plurality of processors for a power consumption level.

4. The system of claim 1 wherein the control system is further configured to reduce a processor power limit of a first processor by a first amount from the average processor power limit and to reduce a processor power limit of a second processor by a second amount from the average processor power limit for processors of the plurality of processors that are at or below the average processor power limit, wherein the first amount is different from the second amount.

5. The system of claim 1 wherein the control system is further configured to determine a headroom amount of additional available power based on the average processor power limit and to increase a processor power limit of a first processor by a first amount and to increase a processor power limit of a second processor by a second amount as a function of the headroom amount for processors of the plurality of processors that are above the average processor power limit.

6. The system of claim 1 wherein the control system is further configured to determine a headroom amount of additional available power and to increase a first processor power limit by a first amount from the average processor power limit and a second processor power limit by a second amount from the average processor power limit as a function of the headroom amount for processors of the plurality of processors that are above the average processor power limit, wherein the first amount is different from the second amount.

7. A method for controlling power, comprising:
determining a power consumption level for each processor of a plurality of processors at an integrated controller;
determining an overall processor power floor with the integrated controller;
determining an overall processor power to be reduced with the integrated controller;
initializing each processor power limit to an average processor power limit when the overall processor power to be reduced is greater than an amount of power that is needed to be reduced with the integrated controller; and
generating one or more processor controls to adjust one or more processor power limits with the integrated controller from the average processor power limit,
the average processor power limit being the ratio of the difference between an overall processor power consumption and the amount of power that is needed to be reduced over the number of processors in the plurality of processors,
the overall processor power to be reduced being the difference between the overall processor power consumption and the overall processor power floor.

8. The method of claim 7 further comprising transmitting a power adjustment control to each processor of the plurality of processors that are at or below the average processor power limit with the integrated controller to reduce the processor power limits for the processors of the plurality of processors that are at or below the average processor power limit from the average processor power limit.

9. The method of claim 7 further comprising querying each of the plurality of processors for a power consumption level with the integrated controller.

10. The method of claim 7 further comprising reducing a processor power limit of a first processor by a first amount from the average processor power limit and to reduce a processor power limit of a second processor by a second amount with the integrated controller from the average processor power limit for processors of the plurality of processors that are at or below the average processor power limit, wherein the first amount is different from the second amount.

11. The method of claim 7 further comprising:
determining a headroom amount of additional available power with the integrated controller based on the average processor power limit; and
increasing a processor power limit of a first processor by a first amount and increasing a processor power limit of a second processor by a second amount as a function of the headroom amount with the integrated controller for processors of the plurality of processors that are above the average processor power limit.

12. The method of claim 7 further comprising:
determining a headroom amount of additional available power with the integrated controller; and
increasing a first processor power limit by a first amount from the average processor power limit and a second processor power limit by a second amount from the average processor power limit as a function of the headroom amount with the integrated controller for processors of the plurality of processors that are above the average processor power limit, wherein the first amount is different from the second amount.

13. A system for controlling power, comprising:
a plurality of processors;
an integrated controller configured to implement and execute one or more algorithms to cause the integrated controller to interface with each of the plurality of processors, to determine a power consumption level for each processor of the plurality of processors, to determine an overall processor power floor, to determine an overall processor power to be reduced, to initialize each processor power limit to an average processor power limit when the overall processor power to be reduced is greater than an amount of power that is needed to be reduced, and to generate one or more processor controls to adjust one or more processor power limits from the average processor power limit,
the average processor power limit being the ratio of the difference between an overall processor power consumption and the amount of power that is needed to be reduced over the number of processors in the plurality of processors,
the overall processor power to be reduced being the difference between the overall processor power consumption and the overall processor power floor.

14. The system of claim 13 wherein the integrated controller is further caused to transmit a power adjustment control to each processor of the plurality of processors that are at or below the average processor power limit to reduce the processor power limits for the processors of the plurality of processors that are at or below the average processor power limit from the average processor power limit.

15. The system of claim 13 wherein the integrated controller is further caused to query each of the plurality of processors for a power consumption level.

16. The system of claim 13 wherein the integrated controller is further caused to reduce a processor power limit of a first processor by a first amount from the average processor power limit and to reduce a processor power limit of a second processor by a second amount from the average processor power limit for processors of the plurality of processors that are at or below the average processor power limit, wherein the first amount is different from the second amount.

17. The system of claim 13 wherein the integrated controller is further caused to determine a headroom amount of additional available power based on the average processor power limit and to increase a processor power limit of a first processor by a first amount and to increase a processor power limit of a second processor by a second amount as a function of the headroom amount for processors of the plurality of processors that are above the average processor power limit.

18. The system of claim 13 wherein the integrated controller is further caused to determine a headroom amount of additional available power and to increase a first processor power limit by a first amount from the average processor power limit and a second processor power limit by a second amount from the average processor power limit as a function of the headroom amount for processors of the plurality of processors that are above the average processor power limit, wherein the first amount is different from the second amount.

19. The system of claim 1 wherein generating one or more processor controls to adjust the one or more of the processor power limits from the average processor power limit comprises generating one or more processor controls to increase a processor power limit to a current power level if the processor current power level is above the average processor power limit and additional headroom is available.

20. The system of claim 1 wherein the control system is configured to reduce the processor power limit for one or more of the plurality of processors that are below the average processor power limit.

* * * * *